United States Patent [19]

Meyer et al.

[11] Patent Number: 5,827,385
[45] Date of Patent: Oct. 27, 1998

[54] METHOD OF PRODUCING AN EVACUATED INSULATED CONTAINER

[75] Inventors: Chris E. Meyer, Xenia; Nicholas Wynne, Hilliard, both of Ohio

[73] Assignee: VacuPanel, Inc., Xenia, Ohio

[21] Appl. No.: 717,854

[22] Filed: Sep. 23, 1996

Related U.S. Application Data

[63] Continuation-in-part of Ser. No. 275,369, Jul. 15, 1994, abandoned.

[51] Int. Cl.[6] ............................. B32B 1/02; B32B 1/06; B32B 31/04; B32B 31/20
[52] U.S. Cl. ..................... 156/87; 156/146; 156/196; 156/245; 156/276; 156/285; 156/286; 156/292; 156/308.4; 156/382; 220/4.24; 220/421; 220/422; 422/102; 428/69
[58] Field of Search ..................... 220/4.21, 4.24, 220/421, 422, 425; 156/286, 276, 382, 285, 245, 196, 87, 69, 145–146, 292; 422/99, 102, 104; 62/457.1, 457.2, 457.7; 428/69

[56] References Cited

U.S. PATENT DOCUMENTS

| | | | |
|---|---|---|---|
| 2,700,633 | 1/1955 | Bovenkirk | 156/286 X |
| 2,764,308 | 9/1956 | Hoch | 220/4.24 |
| 2,986,300 | 5/1961 | Parrish | 220/4.24 |
| 2,999,611 | 9/1961 | Paulson | 220/4.24 |
| 3,052,019 | 9/1962 | Strasser | 156/286 X |
| 3,156,975 | 11/1964 | Shaw | 156/286 X |
| 3,238,002 | 3/1966 | O'Connell et al. | 220/422 X |
| 3,245,195 | 4/1966 | Shaw | 156/286 X |
| 3,416,692 | 12/1968 | Cline et al. | |
| 3,650,871 | 3/1972 | Bentfors | 156/276 X |
| 3,856,178 | 12/1974 | Norgaard | |
| 4,564,547 | 1/1986 | Hughes | 156/276 X |
| 4,636,415 | 1/1987 | Barito et al. | |
| 4,664,254 | 5/1987 | Sitwell et al. | 220/4.24 X |
| 4,668,551 | 5/1987 | Kawasaki et al. | 156/286 X |
| 4,726,870 | 2/1988 | McWilliams et al. | 156/276 X |
| 4,985,106 | 1/1991 | Nelson | 156/276 |
| 4,988,406 | 1/1991 | Nelson | 156/276 X |
| 5,000,998 | 3/1991 | Bendig | 156/276 X |
| 5,066,437 | 11/1991 | Barito et al. | |
| 5,248,039 | 9/1993 | Nordlund | 156/276 X |
| 5,252,408 | 10/1993 | Bridges et al. | 428/69 X |
| 5,273,801 | 12/1993 | Barry et al. | 428/69 |

FOREIGN PATENT DOCUMENTS

| | | | |
|---|---|---|---|
| 2461107 | 6/1996 | Germany | 220/4.24 |
| 1363673 | 10/1993 | U.S.S.R. | 156/276 |

*Primary Examiner*—Adrienne C. Johnstone
*Attorney, Agent, or Firm*—Jacox, Meckstroth & Jenkins

[57] ABSTRACT

Sheets of gas impermeable plastics material are vacuum-formed to produce semi-rigid trays or shells each having side walls extending to form a peripheral flange. The formed shells define a cavity which is filled with an insulation media such as an open cell rigid foam material or a dry silica powder. In one embodiment, a media filled shell and a gas impermeable plastic cover sheet or partially assembled inner and outer shells separated by the media, are placed within a vacuum chamber, and overlapping edge portions or flanges are sealed by a moveable platen after evacuation of the media. The shells may include inner and outer lip portions on opposite side walls to provide for placing two of the insulated shells together in opposing relation to form an insulated container. In another embodiment, the overlapping flanges of the inner and outer shells are sealed together, and the insulation media between the shells is evacuated through a tube which is then closed and sealed.

8 Claims, 2 Drawing Sheets

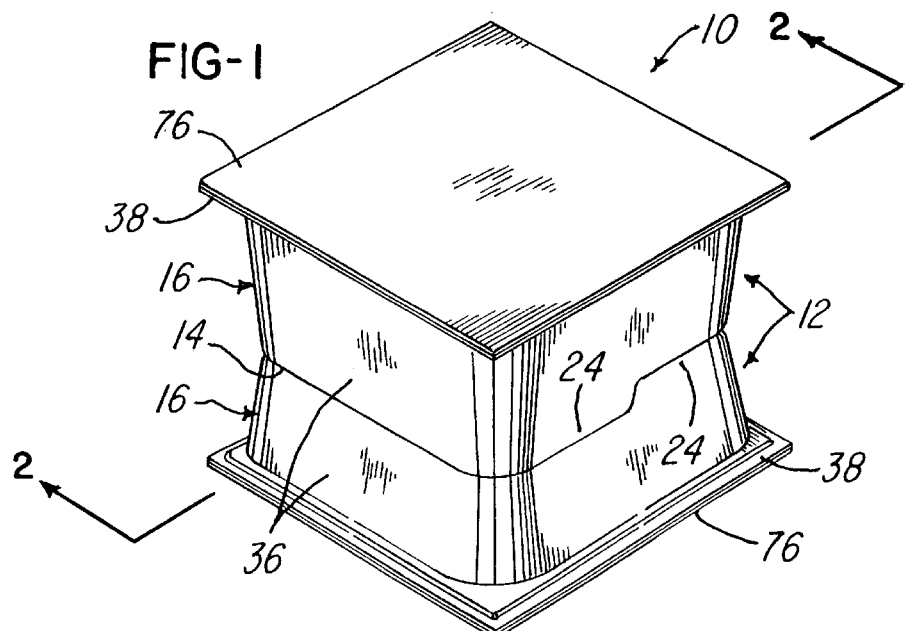
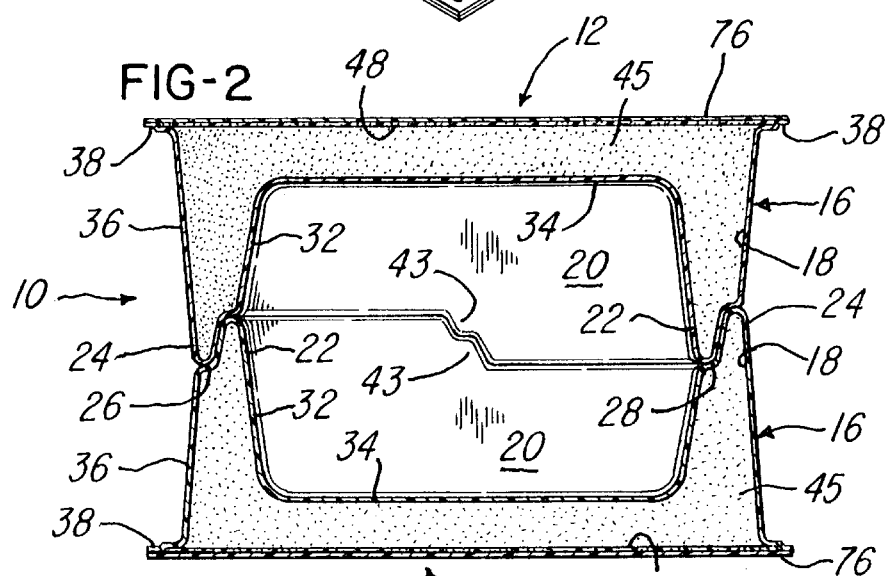
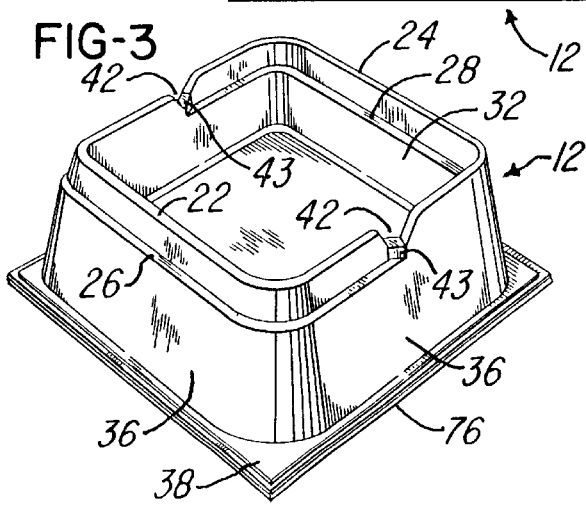
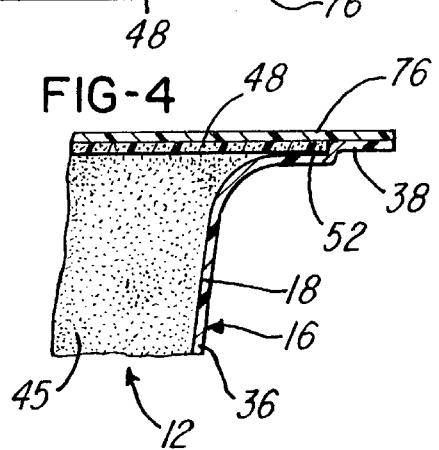

METHOD OF PRODUCING AN EVACUATED INSULATED CONTAINER

RELATED APPLICATION

This application is a continuation-in-part of application Ser. No. 08/275,369, filed Jul. 15, 1994, abandoned.

BACKGROUND OF THE INVENTION

In the art of insulated panels and containers such as shipping containers of the general type disclosed in U.S. Pat. No. 3,093,259, U.S. Pat. No. 3,416,692 and U.S. Pat. No. 3,856,178, it is desirable to use thinner container walls with higher insulation values in order to minimize the size and weight of the container. The higher insulated wall also minimizes the size and weight of the temperature controlling media or dry ice which may be used for maintaining a low temperature for the temperature sensitive article within the container. One proposal for constructing a shipping container with thinner walls and higher insulation values is disclosed in U.S. Pat. No. 5,066,437. This patent discloses the construction of an insulating thermal device having two sectors defining corresponding cavities. One of the cavities is filled with an insulation powder through a fill port, and the powder is then evacuated through an evacuation port while the other adjacent cavity is filled with an expandable plastics foam material. The insulation powder referred to in the '437 Patent is disclosed in U.S. Pat. No. 4,636,415 as precipitated silica. While a cavity filled with evacuated precipitated silica provides very good insulation values, it is desirable to provide for rapid evacuation of the silica powder in a minimum time period so that the containers or panels may be efficiently produced. It has also been found desirable to have an insulated container which requires only one part or component in order to simplify the inventory of container components. It is further desirable to be able to provide a shaped insulated panel which conforms to any object that the panel is to insulate or to a specific container payload or to fill a specified insulation space. In addition, it is desirable to minimize the joints within a container or panel and to have an effective single joint in order to eliminate or minimize leak paths and the transfer of heat.

SUMMARY OF THE INVENTION

The present invention is directed to an improved evacuated insulation panel or container which may be used for forming an insulated shipping container, and to the method of producing the insulated panel or container. An insulated panel or container constructed in accordance with the invention provides all of the desirable features mentioned above, and especially, provides for efficiently producing containers with a minimum wall thickness and with a minimum heat transfer. The evacuated insulation panel or container of the invention may also be formed in practically any shape and may be rapidly evacuated for obtaining high volume production.

In accordance with one embodiment of the invention, an evacuated insulated container is formed by a pair of opposing and identical insulated panels each of which includes a vacuum formed semi-rigid sheet of gas impermeable plastics material forming a tray or shell. The shell has a bottom wall and side walls defining an open top cavity, and the side walls extend to form an outwardly projecting peripheral planar flange. The cavity is filled with an insulation media or material such as silica powder or rigid open cell foam, and a sheet of porous filter material may be placed over the filled cavity and sealed to the flange to hold the powder within the cavity during evacuation. The shell with the insulation is then placed within an evacuation chamber which encloses a platen positioned above the tray, and the platen may be heated.

A sheet of gas impermeable plastics material is supported between the platen and the peripheral flange of the shell. After air is evacuated from the insulation media, the cover sheet is pressed and sealed against the peripheral flange by welding or adhesive to form an air-tight sealed cavity enclosing the insulation media. Each shell is provided with inner and outer lip portions on opposite side walls of the shell and with a partial crossover recess. Thus two of the insulated panels may be pressed together in interfitting relation to form an insulated container defining a chamber for receiving a temperature controlling media such as dry ice and a temperature sensitive article such as a pharmaceutical drug.

In another embodiment, a set of semi-rigid inner and outer tub-like trays or shells are each vacuum formed from a sheet of gas impermeable plastics material, and each shell has an outwardly projecting peripheral flange. The insulation media is placed within the cavity defined between the inner and outer shells, and the media is evacuated in an evacuation chamber while the overlapping flanges are spaced apart to expose a portion of the media between the flanges. After the media is evacuated, the overlapping flanges are pressed together and sealed by welding or adhesive after which the double walled container is removed from the evacuation chamber. As a modification, the insulation media may be evacuated after the overlapping flanges are welded or sealed together by connecting a suction hose from an evacuation pump to the media through an evacuation tube. The tube extends through an opening within the inner or outer shell and is clamped and sealed together after evacuation.

Other features and advantages of the invention will be apparent from the following description, the accompanying drawings and the appended claims.

BRIEF DESCRIPTION OF THE DRAWINGS

FIG. 1 is a perspective view of an insulated shipping container produced in accordance with the invention for transporting a temperature sensitive article;

FIG. 2 is a vertical section of the shipping container, taken generally on the line 2—2 of FIG. 1;

FIG. 3 is a perspective view of an evacuated panel used to form the shipping container shown in FIGS. 1 and 2;

FIG. 4 is an enlarged fragmentary section of a corner portion of an insulated panel shown in FIGS. 1–3;

DESCRIPTION OF THE PREFERRED EMBODIMENTS

Figure 5:
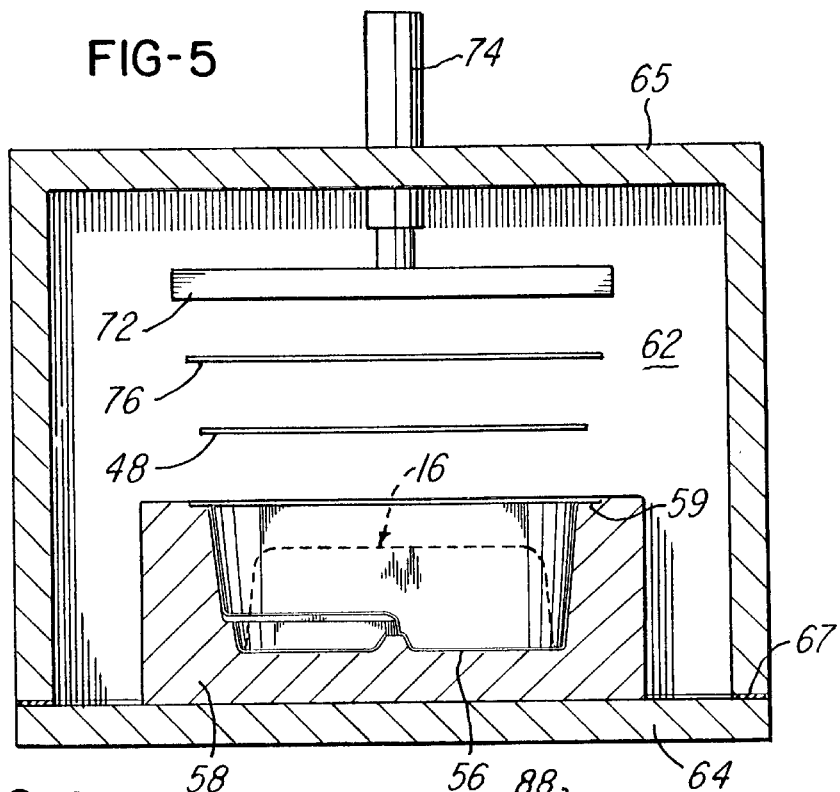
FIG. 5 is a diagrammatic section of the basic components for producing an evacuated insulated panel in accordance with the invention.

FIG. 1 illustrates an insulated shipping container 10 which is formed by two mating and interfitting vacuum insulated containers or panels 12 which are pressed together to form a single peripheral joint 14. The insulated panels 12 are identical, and each panel includes a thermoformed or vacuum formed semi-rigid tray or shell 16 which forms a container and is made from a gas impermeable sheet plastics material, for example, a sheet material sold by BP Chemicals under the trademark BAREX. The material may also be a laminated multiple layer sheet with an outer layer of high impact polystyrene, an inner layer of polyethylene and intermediate layer of ethylene vinyl alcohol. The semi-rigid shell 16 has a uniform wall thickness, preferably about 0.030" and defines on one side a cavity 18 and on the other side a chamber 20.

As shown in FIG. 3, each of the shells 16 includes an inverted U-shaped inner lip portion 22 and an inverted U-shaped outer lip portion 24 which project from corresponding ledges or shoulders 26 and 28, respectively. Each shell 16 has a generally rectangular or square configuration and includes four inner side walls 32 and a bottom wall 34 which define the chamber 20, and four outer side walls 36 extend to form an outwardly projecting and stepped peripheral flange 38. The inner and outer side walls 32 and 36 are tapered and converge inwardly to the lip portions 22 and 24 so that the shells 16 may be nested in stacked relation for convenient handling and storage after the shells are vacuum formed.

Each of the shells 16 also includes a pair of wedge shaped cross over slots 42 in opposite side walls where the inner and outer lip portions 22 and 24 meet. The lip portions are connected by corresponding diagonal ribs 43 which project upwardly (FIG. 3) by one half the height of the lip portions 22 and 24. Thus when a pair of identical panels 10 are assembled together in opposing relation, as shown in FIG. 2, the inner lip portions 22 seat on the inner shoulders 28, and an outer lip portions 24 seat on the outer shoulders 26 to form an interfitting and generally fluid-tight joint 14 between the panels.

Referring to FIGS. 2 and 4, the cavity 18 of each thermoformed or vacuum formed shell 16 is filled with an insulation media or material 45 such as finely divided precipitated power silica disclosed in U.S. Pat. No. 4,636,415 or U.S. Pat. No. 5,084,320 or an open cell rigid foam material made by Dow Chemical Company. When the cavity 18 of the shell 16 is filled with powder insulation, the cavity is covered by a porous filter sheet or panel 48 which is formed of polyester or a blend of polyester and cellulose. The edges of the filter panel 48 are adhesively attached or sealed to the peripheral flange 38, as shown in FIG. 4, within a peripheral recess 52 defined by the stepped peripheral flange 38.

Referring to FIG. 5, the assembly of the shell 16, insulation media 45 and filter panel 48, if used, is placed within a mating cavity 56 of a mold 58 which has a recess 59 surrounding the cavity 56 for receiving the stepped flange 38 of the shell 16. For purpose of illustration, the filter panel 48 is shown elevated or exploded in FIG. 5 within a vacuum chamber 62 defined between a base platen 64 and an open bottom cover housing 65. A peripherally extending resilient gasket 67 forms an air-tight seal between the base platen 64 and the housing 65, and the base platen 64 is supported for vertical movement relative to the housing 65 by a fluid actuated cylinder (not shown).

The housing 65 encloses a platen 72 which may be heated and is supported for vertical movement by a fluid or air actuated cylinder 74. A sheet or film 76 of gas impermeable plastics material, such as the BAREX material mentioned above, is supported above the mold 58 and under the platen 72 in parallel spaced relation. The sheet or film 76 is preferably formed from the same material as used to form the shell 16. If a multiple layer sheet is used, the sheet has a bottom polyethylene layer which opposes the inner polyethylene layer forming the peripheral flange 38 of the shell 16. The sheet 76 may be part of a web of the material which is fed into the chamber 62 under the gasket 67 and supported above the mold 58 between two pairs of pinch bars (not shown) supported by compression springs located outboard of the mold 58. The cover sheet 76 may also be supported by other means which temporarily hold the sheet above the mold 58 and filter panel 48 while the vacuum chamber 62 is evacuated to remove the air from the insulation media 45. During the evacuation, the filter panel 48 is effective to prevent insulation powder from escaping.

After the vacuum chamber 62 is evacuated to a level of about 15 Torr or below and substantially all of the air is removed from the insulation media 45, the platen 72 is lowered to seal the cover sheet 76 by heat welding or adhesive or RF welding to the peripheral flange 38 of the shell 16. After the cover sheet 76 is sealed to the shell 16, air is permitted to re-enter the chamber 62, but is prevented from entering the insulation media 45 so that the media is confined within an air-tight cavity 18 defined between the shell 16 and cover sheet 76.

Figure 6:
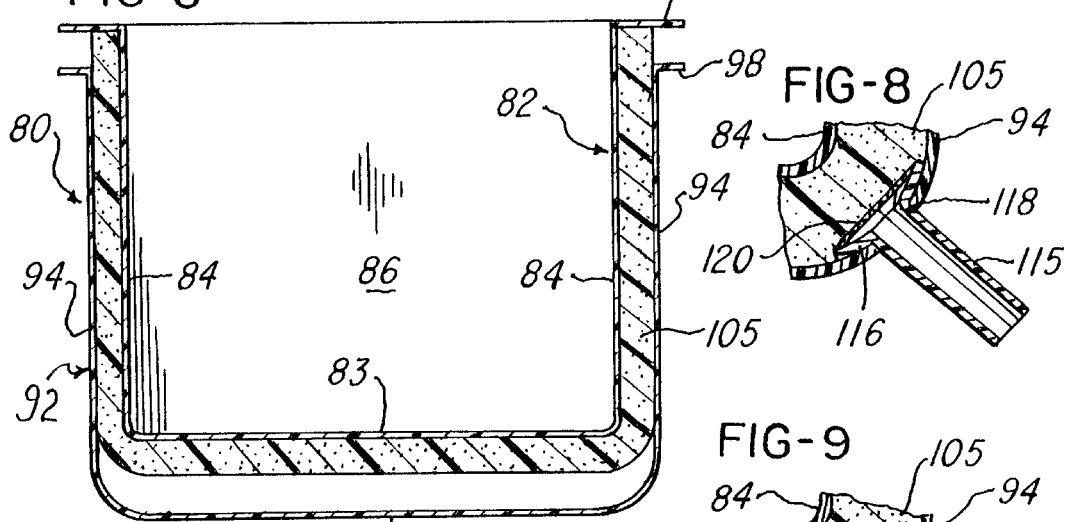
FIG. 6 is a section through a partially assembled inner and outer shells forming an insulated container in accordance with another embodiment of the invention and prior to evacuation.
Figure 7:
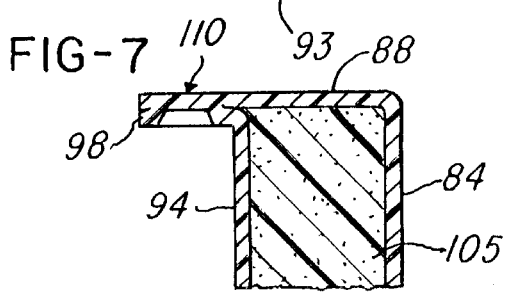
FIG. 7 is an enlarged fragmentary section of the sealed or welded overlapping flanges of the shells shown in FIG. 6 after assembly.

Referring to FIGS. 6 and 7 which illustrate another embodiment of the invention, a double wall container 80 includes an inner thermoformed or vacuum formed tray or shell 82 with a bottom wall 83 and opposing pairs of side walls 84 defining a box-like chamber 86. The walls 84 project outwardly to form a planar peripheral flange 88. The container 80 also includes an outer tray or shell 92 with a bottom wall 93 and opposing pairs of side walls 94 extending parallel to the corresponding inner walls 84 in spaced relation. The walls 94 extend to form an outwardly projecting peripheral flange 98 which extends below the flange 88 of the inner shell 82. An insulation media 105 is preferably the open micro-cell rigid foam material as described above and produced by Dow Chemical Company. The insulation material 105 has generally a uniform thickness and extends around the outer surface of the inner shell 82, as shown in FIG. 6.

When it is desired to evacuate the air from the insulation media 105 within a vacuum chamber, the partially assembled shells 82 and 92 as shown in FIG. 6, are positioned within a vacuum chamber such as the chamber 62 described above in connection with FIG. 5. Air is pulled from the material 105 through the exposed outer end portion of the material between the flanges 88 and 98. To assist in the evacuation of the insulation media or material 105, the inner and outer surfaces of the rigid open cell foam material may be provided with an X-Y grid pattern of small grooves (not shown) which permit faster evacuation.

After the insulation material 105 is evacuated within an evacuation chamber, the inner shell 82 is pressed further down into the outer shell 92, such as by the platen 72 within the chamber 62, until the peripheral flanges 88 and 98 contact each other. The flanges 88 and 98 are then sealed by welding with heat and pressure or by ultrasonic welding to form an integral or common flange 110 (FIG. 7) which forms a fluid-tight seal for the evacuated material 105 confined between the inner and outer shells.

Figure 8:
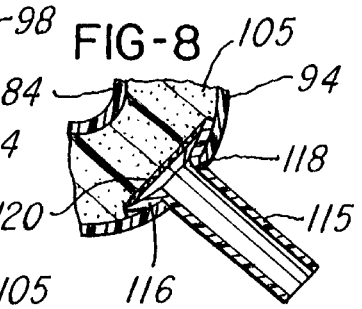
FIGS. 8 and 9 fragmentary sections of the assembled container shown in FIG. 7 and illustrating an alternate method for evacuating the insulation media within the container.
Figure 9:
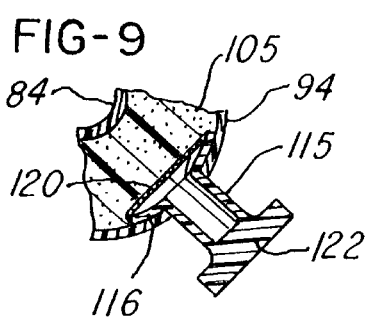

The insulation material 105 may also be evacuated after the flanges 88 and 98 are sealed or welded together as shown in FIG. 7 by means of an evacuation tube 115 (FIG. 8). The tube 115 is preferably formed of a heat deformable plastics material and includes an inner annular flange 116 which is sealed or welded to the inner surface of the outer shell 92 around a hole 118 formed within a corner portion of the outer shell. Preferably, a circular filter screen 120 covers the inner flange 116 of the evacuation tube 115 to prevent any of the insulation media 105 from being sucked into the tube 115 which is connected to a suction source or pump (not shown). After the rigid foam insulation media 105 is evacuated, the tube 115 is clamped or pinched together (FIG. 9) and heat sealed to form a closed end portion 122 so that the insulation material 105 remains evacuated.

From the drawings and the above description, it is apparent that an evacuated insulated shell 16 or container 10 or 80 constructed in accordance with the present invention provides desirable features and advantages. For example, by constructing the panel 12 or container 80 using the steps described above, the insulation media 45 or 105 may be quickly evacuated for high volume production, either through the open top cavity 18 of each shell 16, or through the gap defined between the flanges 88 and 98, as shown in FIG. 6. When the insulation media is a powder, the porous filter panel 48 assures that the powder remains in the shell 16 during the evacuation process within the vacuum chamber 62. The methods of forming an insulated panel 12 or container 80, as described above, also provide for efficiently and economically producing an evacuated insulated container 10 or 80 in high volume production.

As another advantage, the combined insulated chambers 20 of the container 10 are ideally suited for receiving a temperature sensitive article such as a medical or pharmaceutical article along with a heat pack, ice pack or dry ice, and the interfitting panels 12 maintain the article at a substantially constant temperature for an extended period of time. When assembled together as shown in FIGS. 1 and 2, the insulated panels 12, forming the insulated container 10, may be placed into a corrugated paperboard box which closely surrounds the flanges 38 of the panels 12. The identical insulated panels 12 also simplify inventory and storage of shipping containers 10 in that only one component or panel 12 needs to be stocked. The substantially higher insulation value of the evacuated media 45 or 105 also permits the construction of a container 10 or 80 with thinner walls and less weight and further minimizes the volume of heating or cooling energy required to maintain a desired temperature within the container.

While the forms of evacuated insulated panel or containers and their methods of production herein described constitute preferred embodiments of the invention, it is to be understood that the invention is not limited to these precise forms and methods, and that changes may be made therein without departing from the scope and spirit of the invention as defined in the appended claims.

The invention having thus been described, the following is claimed:

1. A method of efficiently producing an insulated container and for minimizing heat transfer through the container, comprising the steps of thermoforming two sheets of gas impermeable plastics material each having a substantially uniform thickness to form an inner shell and an outer shell each having a bottom wall and side walls with the side walls extending to form an outwardly projecting peripheral flange, positioning the inner shell within the outer shell with the corresponding flanges overlapping and with the corresponding walls defining a cavity therebetween, filling the cavity with an insulation media, evacuating the cavity thereby removing substantially all of the air from the insulation media, and sealing the overlapping flanges together to form an air-tight seal between the flanges and to seal the insulation media within the cavity.

2. A method as defined in claim 1 wherein the cavity is evacuated after the flanges are sealed together.

3. A method as defined in claim 2 wherein the cavity is evacuated through a deformable tube extending from the cavity, and including the step of sealing the tube after evacuation.

4. A method as defined in claim 1 wherein the insulation media is an open cell rigid plastics foam material.

5. A method of efficiently producing an insulated container and for minimizing heat transfer through the container, comprising the steps of thermoforming a sheet of gas impermeable plastics material having a substantially uniform thickness to form an outer shell having a bottom wall and side walls with the side walls extending to form an outwardly projecting peripheral flange, thermoforming a second sheet of gas impermeable plastics material to form an inner shell having a bottom wall and side walls with the side walls extending to form an outwardly projecting peripheral flange, positioning the inner shell within the outer shell with the peripheral flanges of the shells overlapping and corresponding side and bottom walls of the shells defining a cavity between the inner and outer shells, filling the cavity with an insulation media, evacuating the cavity thereby removing substantially all of the air from the insulation media, and sealing the peripheral flange of the inner shell to the peripheral flange of the outer shell to form an air-tight seal between the inner and outer shells and to seal the insulation media within the cavity.

6. A method as defined in claim 5 wherein the cavity is evacuated after the peripheral flanges are sealed together.

7. A method as defined in claim 6 wherein the cavity is evacuated through a tube extending from the cavity, and including the step of sealing the tube after evacuation.

8. A method as defined in claim 5 wherein the insulation media is an open cell rigid plastics foam material.

* * * * *